US 9,488,998 B2

(12) United States Patent
Meijer et al.

(10) Patent No.: US 9,488,998 B2
(45) Date of Patent: Nov. 8, 2016

(54) METHOD AND SYSTEM FOR EXTENDING THE LIFETIME OF MULTI-CORE INTEGRATED CIRCUIT DEVICES

(71) Applicant: NXP B.V., Eindhoven (NL)

(72) Inventors: Rinze Ida Mechtildis Peter Meijer, Herkenbosch (NL); Ghiath Al-kadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 106 days.

(21) Appl. No.: 14/521,788

(22) Filed: Oct. 23, 2014

(65) Prior Publication Data

US 2016/0116924 A1   Apr. 28, 2016

(51) Int. Cl.
*G06F 17/50* (2006.01)
*G05F 1/46* (2006.01)

(52) U.S. Cl.
CPC .................... *G05F 1/462* (2013.01)

(58) Field of Classification Search
CPC .... G06F 1/3203; G06F 1/3209; G06F 1/324; G06F 1/206; G06F 1/3221; G06F 1/3287; G06F 3/0625; G06F 3/0634; G06F 3/0689; G06F 1/3296; G06F 11/3058; G06F 1/3206; G06F 1/3215; G06F 1/26
USPC ................................................ 716/100–106
See application file for complete search history.

(56) References Cited

U.S. PATENT DOCUMENTS

| 2008/0168287 A1* | 7/2008 | Berry ..................... G06F 1/266 713/323 |
| 2012/0017188 A1* | 1/2012 | Lepak ................. G06F 17/5022 716/109 |
| 2013/0311792 A1* | 11/2013 | Ponnathota ............... G06F 1/26 713/300 |

OTHER PUBLICATIONS

T-K Chan et.al, "On the Efficacy of NBTI Mitigation Techniques", Proceedings of Date, 2011.
M. Basoglu et.al., "NBTI-Aware DVFS: A New Approach to Saving Energy and Increasing Processor Lifetime", ISPLED 2010.
J. Tschanz et.al. "Adaptive Frequency and Biasing Techniques for Tolerance to Dynamic Temperature-Voltage Variations and Aging",ISSCC 2007.
J. Sun et. al., "NBTI Aware Workload Balancing in Multi-core Systems", Proceedings of ISQED, 2009.
Shidhartha Das et al., "RazorII; In Situ Error Detection and Correction for PVT and SER Tolerance", IEEE Journal of Solid-State Circuits. vol. 44, No. 1, Jan. 2009.
(Continued)

*Primary Examiner* — Binh Tat

(57) ABSTRACT

Embodiments of a method and system are disclosed. One embodiment of an integrated circuit device is disclosed. The integrated circuit device includes first and second processor cores configured to perform a respective first and second set of functional processing. The integrated circuit device also includes a core-specific process state monitor associated with the first processor core, a core-specific process state monitor associated with the second processor core, a core-specific aging monitor associated with the first processor core, a core-specific aging monitor associated with the second processor core, a power management unit, a clock generation unit, and a control system configured to individually control operating points of the first and second processor cores and workload in response to feedback from the core-specific process state monitors and from the core-specific aging monitors.

19 Claims, 3 Drawing Sheets

(56) References Cited

OTHER PUBLICATIONS

Maurice Meijer et al., "Post-Silicon Tuning Capabilities of 45nm Low-Power CMOS Digital Circuits", Symposium on VLSI Circuits Digest of Technical Papers, 2009.
John Keane et al., An On-Chip NBTI Sensor for Measuring pMOS Threshold Voltage Degradation, IEEE Transactions on Very Large Scale Integration (VLSI) Systems, vol. 18, No. 6, Jun. 2010.
Mercati, Pietro et al.; "Workload and User Experience-Aware Dynamic Reliability Management in Multicore Processors"; DAC '13 May 29-Jun. 7, 2013; 6 pgs.; 2013.
Feng, Shuguang et al.; "Maestro: Orchestrating Lifetime Reliability in Chip Multiprocessors"; High Performance Embedded Architecture and Compliers Lecture Notes in Computer Science, vol. 5952; pp. 186-200; 2010.
Basoglu, Mehmet et al.; "Improving Multi-core Processor Energy Efficiency and Lifetime by Embracing Variability and Wearout"; Dept. of Electrical and Computer Engineering; Univ. of Texas at Austin; 4 pgs.; Oct. 2009.
Tiwari, Abhishek et al.; "Facelift: Hiding and Slowing Down aging in Multicores"; Dept. of Computer Science, Univ. of Illinois at Urbana-Champaign; 12 pgs.; 2008.
Oboril, Fabian et al.; "Reducing NBTI-induced Processor Wearout by Exploiting the Timing Slack of Instructions"; CODES_ISSS'12; pp. 443-451; 2012.
Oboril, Fabian et al.; "Reducing Wearout in Embedded Processors Using Proactive Fine-Grain Dynamic Runtime Adaptation"; 2012 17th IEEE European Test Symposium (ETS); 6 pgs.; 2012.

* cited by examiner

METHOD AND SYSTEM FOR EXTENDING THE LIFETIME OF MULTI-CORE INTEGRATED CIRCUIT DEVICES

Integrated circuit (IC) devices with multiple processor cores, referred to as "multi-core processors," are being used in more and more electronic devices. Additionally, such electronic devices are expected to function properly over longer periods of time, for example, up to twenty to thirty years. Although the lifetime expectation is high, IC devices, such as multi-core processors, are affected by a transistor wearout mechanism known as Negative Bias Temperature Instability (NBTI). NBTI, which can be triggered by high supply voltages and high operating temperatures, leads to a shift in the threshold voltage, $V_{th}$, of the transistors in an IC device. An increase in the threshold voltage of transistors in an IC device leads to increasing switching delays and over time can increase path delays, which can lead to timing violations and ultimately to core failure. Many techniques have been used to deal with NBTI in IC devices so as to extend the useful lifetime of such devices. Other wearout mechanisms such as Positive Bias Temperature Instability (PBTI) and Hot Carrier Injection (HCI) may affect the lifetime performance of IC devices. Additionally, with regard to extending the lifetime of multi-core processors, application-level load balancing has been used to evenly distribute the workload amongst multiple processor cores.

Embodiments of a method and system are disclosed. One embodiment of an integrated circuit device is disclosed. The integrated circuit device includes first and second processor cores configured to perform a respective first and second set of functional processing. The integrated circuit device also includes a core-specific process state monitor associated with the first processor core, a core-specific process state monitor associated with the second processor core, a core-specific aging monitor associated with the first processor core, a core-specific aging monitor associated with the second processor core, a power management unit, a clock generation unit, and a control system configured to individually control operating points of the first and second processor cores and workload in response to feedback from the core-specific process state monitors and from the core-specific aging monitors.

An embodiment of a method for operating an integrated circuit device that includes multiple processor cores is disclosed. The method involves monitoring process state parameters of the processor cores using core-specific process state monitors in the integrated circuit, monitoring aging parameters of the processor cores using core-specific aging state monitors in the integrated circuit, adjusting power and clock frequency to the processor cores on a processor-specific basis in response to the process state and aging state monitoring, and adjusting workload distribution amongst the processor cores in response to the process state and aging state monitoring.

Other aspects in accordance with the invention will become apparent from the following detailed description, taken in conjunction with the accompanying drawings, illustrated by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
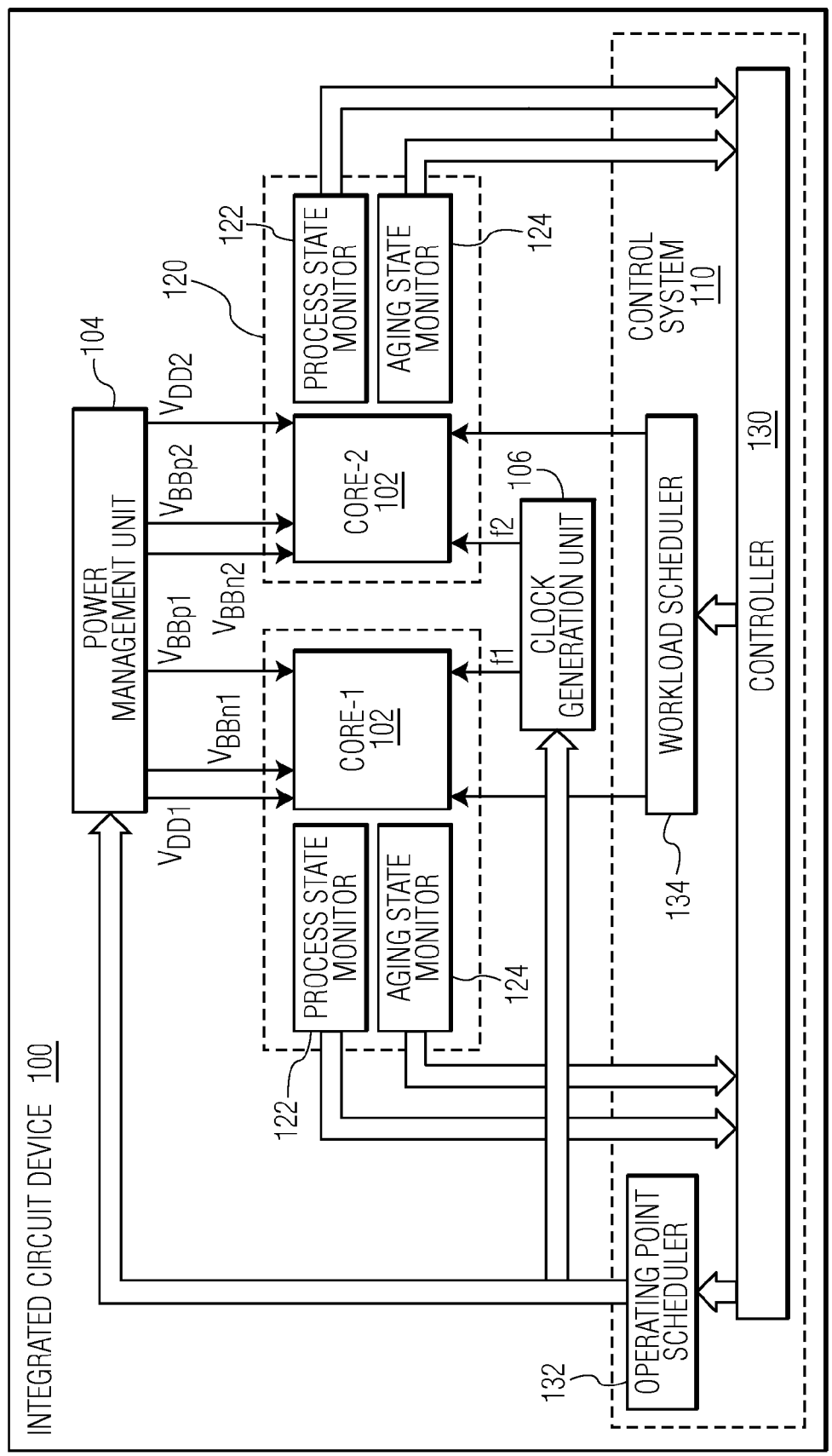
FIG. 1 depicts an embodiment of an IC device that includes two processor cores and a control system for implementing control logic to extend the overall lifetime of the IC device.

FIG. 1 depicts an embodiment of an integrated circuit (IC) device 100 that includes two processor cores 102, identified as "Core-1" and "Core-2," which are configured to perform functional processing independent of each other. The IC device also includes a power management unit (PMU) 104, a clock generation unit (CGU) 106, and a control system, each of which is described in more detail below. In an embodiment, the IC device is fabricated using CMOS technology.

An IC device that has more than one processor core is often referred to as a multi-core processor or a many-core processor. Each processor core in a multi-core processor can perform functional processing independent of each other including reading and executing program instructions independent of each other. In an embodiment, the instructions are ordinary CPU instructions such as add, move data, and branch. In an embodiment, a set of at least two processor cores perform respective first and second sets of functional processing (e.g., executing program instructions), where the functional processing sets do not overlap. In the embodiment of FIG. 1, both processor cores 102 are located in the same contiguous substrate, i.e., on the same die. However, in other embodiments, the multiple processor cores can be located on different non-contiguous substrates, i.e., on different die, but integrated into the same IC device package. In both cases, a single multi-core IC device includes at least two independent processor cores. In an embodiment, the processor cores of the IC device are homogeneous, e.g., the processor cores are physically alike and the processor cores execute the same instruction sets and use the same data structures, and in another embodiment, the processor cores of the IC device are heterogeneous, e.g., the processor cores are physically different and/or the processor cores execute different instruction sets and use different data structures. Additionally, although the IC device 100 of FIG. 1 is shown as including only two processor cores, an IC device with more than two processor cores is possible.

The power management unit 104 of the IC device 100 manages the supply of power to the processor cores 102. In the embodiment of FIG. 1, the power management unit can individually control the power supply to each processor core. For example, the power management unit can simultaneously provide different amounts of power to each different processor core. Thus, the power management unit is able to control the power supplied to the processor cores on a per-core, or core-specific, basis. In the embodiment of FIG. 1, power is supplied to the processor cores as supply voltage, $V_{DD}$, and body bias voltage for the "n" and "p" transistors, $V_{BBn}$ and $V_{BBp}$, respectively. The voltages supplied to Core-1 are identified as $V_{DD1}$, $V_{BBn1}$, and $V_{BBp1}$ and the voltages supplied to Core-2 are identified as $V_{DD2}$, $V_{BBn2}$, and $V_{BBp2}$. In an embodiment, the supply voltage, $V_{DD}$, may be, for example, 0.5V, 0.7V, 0.9V, or 1.1V. The body bias voltage, $V_{BB}$, may be, for example, for n-transistors, $V_{BBn}$, in the range of, for example, from −1V up to 0.5V. Note that the lower value of −1V could be lower, e.g., −1.5V or −2V. However, the lower value cannot go higher than a diode voltage (e.g., 0.7V) because of excessive current. For p-transistors, the body bias is referenced to $V_{DD}$ (and not to ground as in the case of n-transistors), therefore, $V_{BBp}$, can be in the range of, for example, $V_{DD}$−0.5V up to VDD+1V. VDD−0.5V for the p-transistor is the equivalent of $V_{BBn}$ of 0.5V for n-transistors. While the above-described values apply to traditional bulk CMOS technology, it may be different for Fully-depleted Silicon-on-Insulator (FDSOI) CMOS technology. For example, FDSOI technology can make use of flipped wells, which means that −0.5V<$V_{BBn}$<1 v (can also be 1.5V or 2V); for a flipped well, the lower end of the $V_{BBn}$ range is limited versus the case with no flipped well. The case of no flipped well and FDSOI technology gives the same range of $V_{BBn}$ as traditional bulk CMOS (as described above).

The clock generation unit 106 of the IC device 100 provides a clock signal to each processor core 102. In the embodiment of FIG. 1, the clock generation unit can individually control the frequency, f, of the clock signal that is provided to each processor core. For example, the clock generation unit can simultaneously provide clock signals with different frequencies to each different processor core. Thus, the clock generation unit is able to control the frequency of the clock signals on a per-core, or core-specific, basis. In the embodiment of FIG. 1, the frequency of the core-specific clock signal for Core-1 is identified as $f_1$ and the frequency of the core-specific clock signal for Core-2 is identified as $f_2$. In an embodiment, the clock frequency may be in the range of, for example, 100 kHz-10 GHz, with some high-end multi-core processors operating at clock frequencies in the range of, for example, 800 MHz-2 GHz.

As described above, integrating multiple cores into a single IC device enables the processing capabilities of the IC device to be increased. However, due to factors such as variations in the fabrication process and NBTI, the individual processor cores tend to perform differently over the lifetime of the IC device. In accordance with an embodiment of the invention, an IC device with multiple processor cores is equipped with core-specific monitors to monitor certain operating point and workload parameters on a per-core basis and with a control system to individually control operating points and workload in response to feedback from the core-specific monitors. The core-specific monitoring and feedback control enables each processor core to be individually controlled in a manner that can extend the overall lifetime of the IC device. For example, the core-specific monitoring is implemented to measure a performance characteristic of each processor core (e.g., how fast/strong or slow/weak) and the core-specific control implements runtime adjustments of the operating points (e.g., power supply and clock frequency) and workload distribution on a per-core basis based on the relative performance amongst the processor cores to, for example, push more workload to the faster processor core. By pushing more workload to the faster/stronger processor core and actively controlling operating points to manage the effects of NBTI, the useful lifetime of multi-core IC devices can be extended.

To implement core-specific monitoring, an IC device is equipped with core-specific monitors associated with each processor core. With reference to FIG. 1, the IC device 100 includes two core modules 120, with each core module including one of the processor cores 102, a process state monitor 122, and an aging state monitor 124.

The core-specific process state monitors 122 monitor an aspect of the corresponding processor core 102 that provides an indication of a process dependent characteristic of the processor core. For example, the process dependent characteristic provides an indication of the speed at which the processor core can operate, e.g., a "speed signature" that is an indication of how fast/strong or slow/weak the processor core is. Due to process variability, one core can have a different intrinsic performance (e.g., measured in cycles per second) than another. This could be due to, for example, process variability of the transistor threshold voltage (Vth), where a higher threshold voltage corresponds to a slower switching transistor and a lower threshold voltage corresponds to a faster switching transistor. A similar effect is found at the core level such that two of the same cores (e.g., cores fabricated in the same process) can have different intrinsic performances due to, for example, process variability, resulting in a "fast" core and a "slow" core. When operating to achieve a frequency setpoint (at a given $V_{DD}$ and given $V_{BB}$), the slow core has more difficulty achieving the frequency setpoint than the fast core. In this context, a slow core is a "weak" core and a fast core is a "strong" core.

In an embodiment, a process state monitor includes a ring oscillator that measures intrinsic performance (e.g., measured in cycles per second) of the core. In an embodiment, the ring-oscillator frequency is compared to a fixed time reference for different chip samples and even for different cores of the same chip sample. Different speed signatures can be found as a consequence of, for example, process variability. In another embodiment, a process state monitor includes flip-flops (e.g., Razor or Razor-like flip-flops such as Timer flip-flops and crystal flip-flops) to measure the intrinsic performance of the core. An example of a process state monitor is described in S. Das et. al., *RazorII: In Situ Error Detection and Correction for PVT and SER Tolerance*, IEEE Journal of Solid-State Circuits, Vol. 44, No. 1, January 2009, pp. 32-48, and M. Meijer et. al., *Post-Silicon Tuning Capabilities of 45 nm Low-Power CMOS Digital Circuits*, Symposium on VLSI Circuits 2009, which are incorporated by reference herein. In an embodiment, the process state monitor includes a circuit element that is fabricated on the same substrate as the processor core, e.g., an "in-situ" monitor. In an embodiment, the process state monitors are replica circuits that match an aspect of the processor core behavior. The core-specific process state monitor for each processor core may monitor more than one parameter and may include more than one monitor element/circuit.

The core-specific aging state monitors 124 monitor an aspect of the processor core 102 that provides an indication of how the performance of the processor core has changed over time. For example, the aging state monitors are configured to measure the impact of NBTI over time. Aging can manifest itself when, for example, the circuit initially meets a performance target and over time the circuit no longer meets the performance target. As is known in the field, NBTI increases the transistor threshold voltage (Vth) over the product lifetime, and thus degrades the performance of the circuit over the product lifetime.

In an embodiment, an aging state monitor includes a ring oscillator that measures the intrinsic performance (e.g., in cycles per second) of the core. In an embodiment, a replica logic circuit (e.g., a ring-oscillator) that has the same properties as the processor core is used as the aging state monitor. The replica logic has the same activity profile as the processor core, i.e., when the processor core is active, the replica logic is also active and when the processor core is inactive, the replica logic is also inactive. Within certain boundaries, the replica logic will degrade in a proportional manner to the processor core. Therefore, a measurement of the aging of the replica logic will give an indication of the aging of the circuits of interest (e.g., a processor core).

In another embodiment, the aging state monitor includes flip-flops (e.g., Razor or Razor-like flip-flops such as Timer flip-flops and crystal flip-flops) to measure the intrinsic performance (e.g., in cycles per second) of a processor core. In an embodiment, Razor flip-flops are used to measure if a protected circuit path can reach its timing. If not, the Razor flip-flops can signal such to a control unit. Therefore, when accounting for the dynamic effect measured over a product lifetime, Razor flip-flops can signal when the path is no longer meeting its performance.

In an embodiment, a delay-locked loop that directly translates the pMOS threshold voltage degradation caused by NBTI into a shift in the control voltage of the delay-locked loop. Examples of aging state monitors are described in S. Das et. al., *RazorII: In Situ Error Detection and Correction for PVT and SER Tolerance*, IEEE Journal of Solid-State Circuits, Vol. 44, No. 1, January 2009, pp. 32-48, J. Sun et. al, *NBTI Aware Workload Balancing in Multi-core Systems*, Proceedings of ISQED, 2009, and J. Keane et. al., *An On-Chip NBTI Sensor for Measuring pMOS Threshold Voltage Degradation*, IEEE Transactions on Very Large Scale Integration (VLSI) Systems, Vol. 18, No. 6, June 2010, which are incorporated by reference herein. In an embodiment, an aging state monitor includes a circuit element that is fabricated on the same substrate as the processor core. In an embodiment, the aging process state monitors are replica circuits that match an aspect of the processor core behavior. The core-specific aging state monitor for each processor core may monitor more than one parameter and may include more than one monitor element circuit. In an embodiment, an aging state monitor includes a computer implemented model that estimates the processor core lifetime based on workload data, e.g., accumulated to date workload and or predicted future workload. In an embodiment, the aging state monitor includes firmware to execute an on-device workload model.

In an embodiment, an aspect of the process state monitoring and the aging state monitoring can be performed by the same physical monitor circuits. For example, a ring oscillator can be used to monitor both a process state parameter and an aging state parameter.

The process state monitors 122 and the aging state monitors 124 provide feedback to the control system 110 that is used to individually control operating points and workload distribution on a per-core basis. In the embodiment of FIG. 1, the control system includes a controller 130, an operating point scheduler 132, and a workload scheduler 134. The controller receives the feedback from the core-specific process state monitors and from the core-specific aging state monitors and uses the information provided in the feedback to generate control instructions that are provided to the operating point scheduler and to the workload scheduler. The operating point scheduler provides control instructions (or signals) to the power management unit 104 to control the power that is supplied to the processor cores 102. For example, the operating point scheduler provides core-specific operating point instructions to the power management unit that specify values for $V_{DD1}$, $V_{BBn1}$, $V_{BBp1}$, $V_{DD2}$, $V_{BBn2}$, and $V_{BBp2}$ and core-specific operating point instructions (or signals) to the clock generation unit 106 that specify clock frequencies $f_1$ and $f_2$. The workload scheduler provides instructions to the processor cores that control the distribution of workload amongst the processor cores. For example, the workload scheduler schedules instructions to be executed on the processor cores and the distribution of the instructions amongst the cores is based on the aging of the cores. For example, one core would get more instructions (e.g., add, multiply, subtract, jump, etc.) than the other core. In an example, based on measurements, e.g., from the aging monitor, Core-1 gets more work than Core-2. Over the product lifetime, Core-1 could become more degraded due to aging than Core-2, and eventually, the workload scheduler would schedule more instructions to Core-2 than to Core-1. In another example, the workload scheduler controls workload by providing a clock gating signal that enables and disables the clock signal within the respective processor cores. When the clock gating signal enables the clock signal, the respective processor core is able to execute tasks but when the clock gating signal disables the clock signal, the processor core is not able to execute tasks.

With the ability to monitor the process state and the aging state on a core-specific basis and the ability to control operating points (e.g., power supply and clock frequency) and workload distribution on a per-core basis, in accordance with an embodiment of the invention, the control system is configured to implement control logic to extend the lifetime of an IC device. In an embodiment, the control logic is configured to push more workload onto the faster processor core and less workload onto the slower processor core, and to control the operating points of the processor cores on a per-core basis to mitigate NBTI, thereby extending the overall lifetime of the IC device. Similar control logic can be implemented in multi-core IC devices with more than two processor cores.

Figure 2:
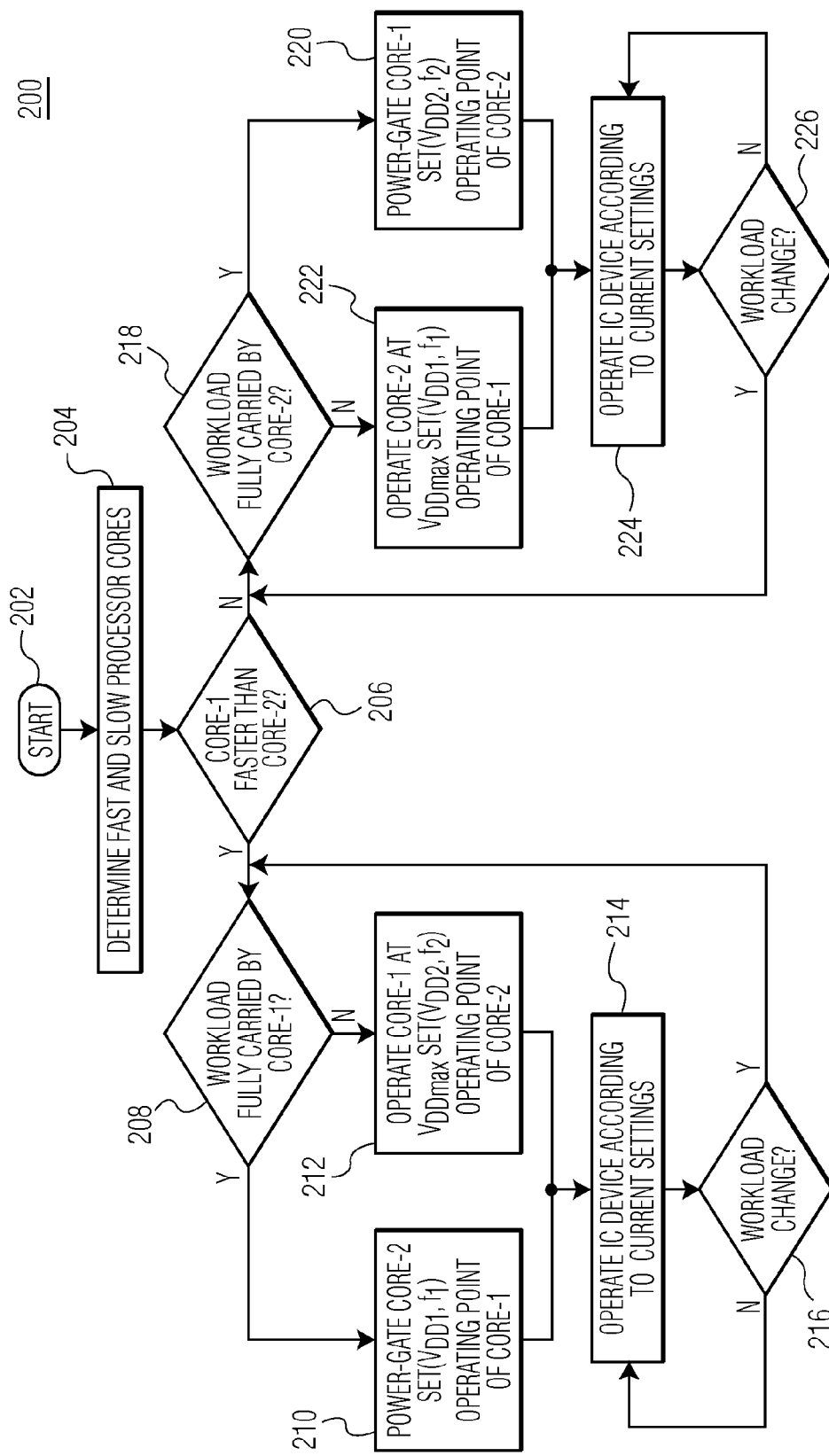
FIG. 2 is a process flow diagram of an example of control logic that can be implemented within the IC device of FIG. 1 to extend the overall lifetime of the IC device.

FIG. 2 is a process flow diagram of an example of control logic 200 that can be implemented within the IC device of FIG. 1 to extend the overall lifetime of the IC device. At block 202, the process starts and at block 204, the process state monitors are used to determine which are the fast and slow processor cores, e.g., the relative processing speed of the processor cores. As described above, the process state monitors may include ring oscillators that are fabricated on the same die as the processor cores. At decision point 206, it is determined whether Core-1 is faster than Core-2. For example, the relative speed of the two cores is determined by comparing the performance of the respective ring-oscillator or by comparing the performance of the cores by using an insitu circuit like Razor to observer the timing performance of a certain reference path or reference paths (in case the cores are equal in terms of functionality, i.e., identical cores). In an embodiment, the determination may be made during a calibration sequence of the chip. If Core-1 is faster than Core-2, then the process moves to the left-side branch and if Core-2 is faster than Core-1, then the process moves to the right-side branch.

If Core-1 is faster than Core-2 then the process moves to the left-side branch and at decision point 208, it is determined whether or not the workload can be fully carried by Core-1. If the workload can be fully carried by Core-1, then at block 210, Core-2 is power gated and the operating points ($V_{DD1}$, $f_1$) of Core-1 are set. For example, the operating points are set such that the core can just process the workload, e.g., 75% of max $V_{DD}$ and the maximum frequency that can run at 75% $V_{DD}$. In an embodiment, frequency and $V_{DD}$ can be coupled, e.g., Dynamic Voltage and Frequency Scaling). However, $V_{DD}$ could also be set to the maximum, with operation at the minimum frequency to process the workload, e.g., 60% of the maximum frequency, $f_{max}$. In an embodiment, for aging mitigation, the core would be operated at the lowest supply voltage possible, while taking advantage of the higher intrinsic performance of a given core.

If the workload cannot be fully carried by Core-1, then at block 212, the supply voltage of Core-1, $V_{DD1}$, is set at its maximum, $V_{DDmax}$, and the operating points ($V_{DD2}$,$f_2$) of Core-2 are set. For example, the operating points or Core-2 are set based on whether the cores are equally strong/weak or whether one core is stronger than the other. If the two cores are equally strong/weak, then workload may be balanced between both cores. The cores would then operate at the same $V_{DD}$ and frequency (in case of identical cores). When one core is stronger than the other, the workload scheduling may account for that to schedule more workload on the stronger core and less workload on the weaker core. Consequently, the stronger core operates at a higher $V_{DD}$ and frequency than the weaker core. For example, the strong core is set at 80% $V_{DDmax}$ and at 70% of $f_{max}$, while the weaker core is set at 50% $V_{DDmax}$ and at 40% of $f_{max}$. In this example, Core-2 is weaker than Core-1, so the supply voltage and frequency of Core-2 should be just enough to process its workload. Depending on the amount of workload, a given $V_{DD}$ and frequency is selected. If the workload is equal to the workload of Core-1, then also for Core-2 the supply voltage, $V_{DD}$, would be $V_{DDmax}$ as in the case of Core-1.

Once the operating points are set according to block 210 or block 212, at block 214, the IC device operates according to the current settings until a change in workload occurs. For example, the change in workload is a change in the total volume and/or rate of instructions that need to be executed by the processor cores. At decision point 216, it is determined whether or not there has been a change in the workload. For example, a change in the workload may involve an increase in the volume and/or rate of instructions that need to be executed by the processor cores. If there is no change in the workload, the process returns to block 214 and the IC device continues to operate according to the current settings. However, if there is a change in the workload, the process returns to decision point 208, where the operating points and workload distribution are adjusted as needed.

Returning to decision point 206, if Core-2 is faster than Core-1, then the process moves to the right-side branch and at decision point 218, it is determined whether or not the workload can be fully carried by Core-2. If the workload can be fully carried by Core-2, then at block 220, Core-1 is power gated and the operating points ($V_{DD2}$, $f_2$) of Core-2 are set. For example, the operating points are set similar to that described above with the operating points of Core-1 swapped with the operating points of Core-2. If the workload cannot be fully carried by Core-2, then at block 222, the supply voltage of Core-2, $V_{DD2}$, is set at its maximum, $V_{DDmax}$, and the operating points ($V_{DD1}$,$f_1$) of Core-1 are set. For example, the operating points of Core-1 are set similar to that described above with the operating points of Core-1 swapped with the operating points of Core-2. Once the IC device is set according to block 220 or block 222, at block 224, the IC device operates according to the current settings until a change in workload occurs. At decision point 226, it is determined whether or not there has been a change in the workload. If there is no change in the workload, the process returns to block 224 and the IC device continues to operate according to the current settings. However, if there is a change in the workload, the process returns to decision point 218, where the operating points and workload distribution are adjusted as needed.

In an embodiment, as the initial (and normal) operating point settings, the control system sets the operating points to values at which NBTI mitigation is maximized, e.g., a maximum forward body bias, $V_{BBmax}$, and a minimum supply voltage, $V_{DDmin}$, for each processor core.

In an embodiment, the control system controls the processor cores so that the fast processor core is loaded with instruction execution responsibility before the slow processor core. If the fast processor core can handle the entire workload, the slow processor core is power-gated to mitigate NBTI stress. For example, the workload scheduler initially assigns the full workload to the fast processor core by disabling the clock signal to the slow processor core. When the fast processor core cannot fully accommodate the entire workload with its operating points set at the initial (normal) settings, the operating points of the processor core are adjusted. For example, the forward body biasing, $V_{BB}$, is increased to reduce NBTI-induced stress. Additionally, the supply voltage, $V_{DD}$, can be increased when the forward body biasing, $V_{BB}$, has reached its maximum, or when forward body biasing cannot be applied. The clock signal frequency, f, of the fast processor core can be increased in close alignment with the increased supply voltage, $V_{DD}$, for example, operating at the maximum clock frequency, f, for the given supply voltage, $V_{DD}$.

In an embodiment, the control system 110 enables the second (slow) processor core after the fast processor core cannot accommodate the workload requirements with its operating points at the initial (normal) settings. After enabling the second processor core, the second processor core operates at the initial (normal) operating point settings with the least NBTI-induced stress. The operating point settings of the second processor core are different than the operating point settings of the first processor core. The workload scheduler 134 now schedules the workload proportionally to the fast and slow processor cores, for example, more workload to the fast processor core, and less workload to the slow processor core. When more workload needs to be processed, the operating point settings of the slow processor core can be adapted similarly as described above for the fast processor core, e.g., increasing the supply voltage, $V_{DD}$, and the clock frequency, f. More workload is then assigned by the workload scheduler to the slow processor core.

Finally, the control system 110 can provide the signaling to higher-level software, or to the user, about the remaining lifetime of the IC device. The control system, including the controller 130, the operating point scheduler 132, and the workload scheduler 134, can be, for example, implemented in hardware or implemented through embedded software.

Figure 3:
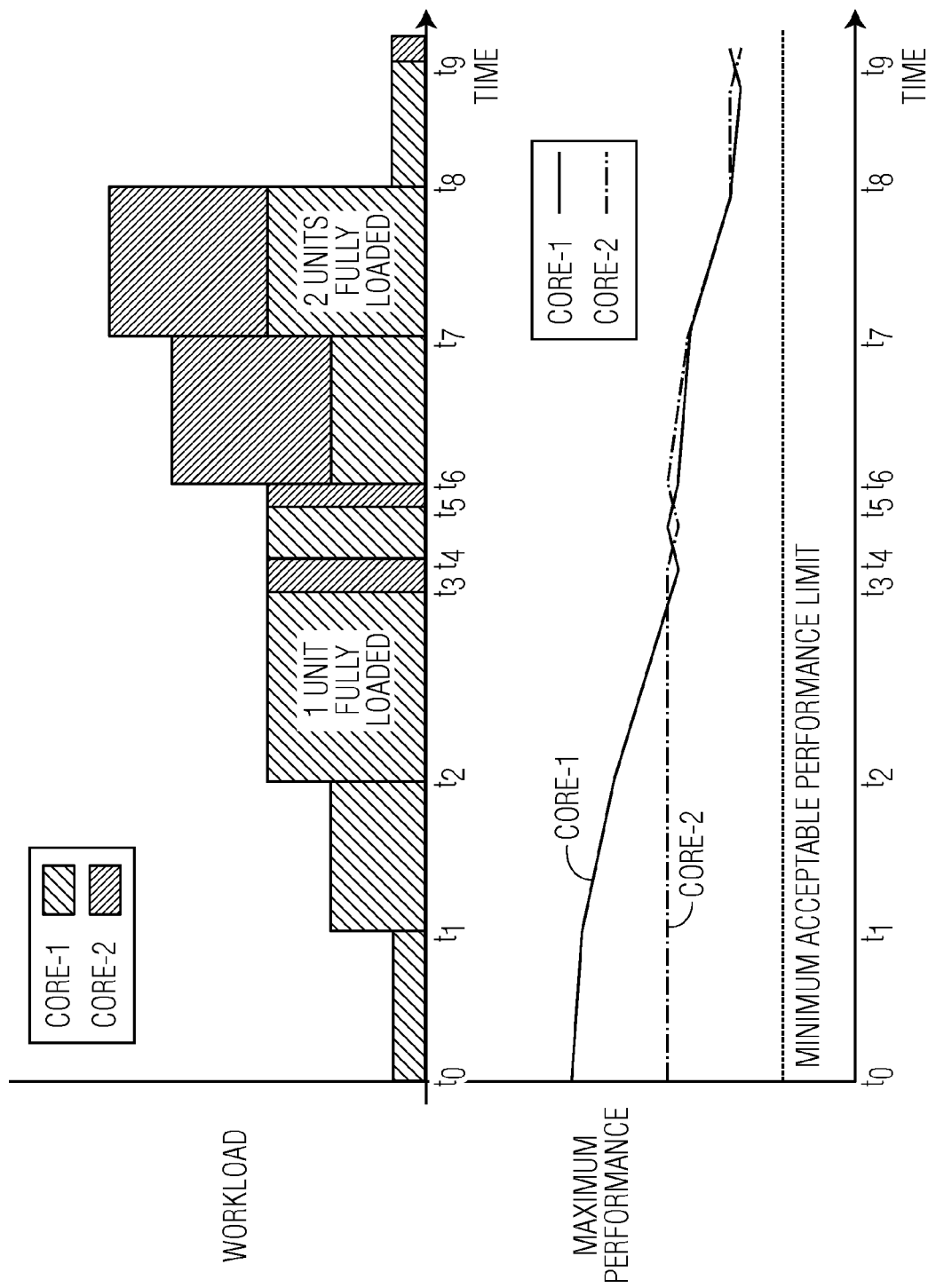
FIG. 3 depicts example time-synchronized graphs of workload and performance that may result from implementing control logic similar to the logic described with reference to FIG. 2 on the IC device described with reference to FIG. 1.

FIG. 3 depicts example time-synchronized graphs of workload and performance that may result from implementing control logic similar to the control logic 200 described above with reference to FIG. 2 on the IC device 100 described with reference to FIG. 1. The upper graph is a timeline of the magnitude of the workload of the two processor cores, Core-1 and Core-2, and the lower graph is a timeline of the magnitude of the maximum performance (e.g., in cycles per second) of Core-1 and Core-2 over the same time period as the upper graph. In FIG. 3, workload executed by Core-1 is indicated by right-leaning hatching and workload executed by Core-2 is indicated by left-leaning hatching. The lower graph also indicates the minimum acceptable performance limit, which can be a user defined value. In an embodiment, the maximum performance refers to the intrinsic maximum performance of the processor core in cycles per second. In FIG. 3, at the start, Core-1 has a higher maximum intrinsic performance than Core-2, for example, because of process variability. Over time, the maximum intrinsic performance (e.g., the maximum performance) of Core-1 is degrading more than the maximum intrinsic performance of Core-2. At time t3, Core-2 has a higher maximum intrinsic performance than Core-1.

As indicated in FIG. 3, initially (at time, $t_0$), Core-1 has a higher maximum performance than Core-2 and Core-1 is loaded with a small workload. In an embodiment, the operating points of Core-1 and Core-2 are set and Core-2 is power-gated. Generally, when a core is fully loaded, the core works at its maximum $V_{DD}$ and maximum frequency. Usually, it can be assumed that the workload is proportional to frequency. So, 10% workload corresponds to 10% of $f_{max}$ and 50% workload corresponds to 50% of $f_{max}$. For $V_{DD}$, $V_{DD}$ and frequency have a nonlinear proportionality: frequency=$(V_{DD}-Vth)^{\alpha}/k*V_{DD}$, known as Sakurai's alpha power law. Accordingly, at 100% $f_{max}$=100% $V_{DDmax}$, e.g., 30% $f_{max}$=50% $V_{DDmax}$. When $V_{DD}$ reduces linearly, the frequency reduces faster than linear but slower than quadratically.

During operation, Core-1 experiences small NBTI-induced performance degradation since it operates from a minimum $V_{DD}$. Because Core-2 is power-gated, Core-2 will not experience NBTI-induced performance degradation. At time, $t=t_1$, Core-1 becomes more loaded, which causes the supply voltage, $V_{DD1}$, to be increased to accommodate for the needed increase in performance, and consequently Core-1 will experience somewhat higher NBTI-induced performance degradation. At time, $t=t_2$, Core-1 becomes fully loaded and the supply voltage, $V_{DD1}$, is at the maximum level, thus causing NBTI-induced performance degradation to increase. At time, $t=t_3$, the maximum performance of Core-1 becomes lower than the maximum performance of Core-2, thus, Core-2 is now the fastest core. In response to the change in relative maximum performance, Core-2 is loaded (and thus NBTI-stressed), while Core-1 is power-gated. Power-gating Core-1 allows Core-1 time to recover from the effects of NBTI. At time, $t=t_4$, the maximum performance of Core-2 becomes lower than the maximum performance of Core-1, thus, the workload is pushed to Core-1. At time, $t=t_5$, the maximum performance of Core-1 becomes lower than the maximum performance of Core-2, thus, the workload is pushed to Core-2 and at this point in time, both processor cores have a similar maximum performance. At time, $t=t_6$, more workload is needed than one processor core can handle, so both processor cores take on workload. Since Core-2 has a higher maximum performance than Core-1, Core-2 will operate at the maximum supply voltage, $V_{DDmax}$, and core-1 will operate at a reduced supply voltage. Therefore, Core-1 will experience less NBTI-induced stress than Core-2. At time, $t=t_7$, both Core-1 and Core-2 are maximally loaded and will operate at their maximum supply voltage and both will experience a high amount of NBTI-induced stress. At time, $t=t_8$, the workload is greatly reduced and in response, Core-2 is power-gated and Core-1 is supplied with a reduced supply voltage, $V_{DD1}$. At time $t=t_9$, Core-2 will take over from Core-1 and Core-1 is power-gated such it can recover. In this example we assume no duty cycling.

In an embodiment, the control logic described above with reference to FIGS. 1-3 is implemented without the need for higher-level application knowledge. That is, the control logic does rely on knowledge of the application that is being executed by the processor cores. Rather, the control logic relies on the direct feedback from the process state and aging state monitors to make adjustments in the operating points and adjustments in the workload distribution amongst the processing cores. Further, in an embodiment, the control logic is implemented in an automatic manner by the control system at run-time, with control adjustments being evaluated on a periodic basis, on the order of, for example, milliseconds with control adjustments being made in seconds.

Although the IC device 100 is described as including only the power management unit 104, the clock generation unit 106, and the control system 110, the IC device may include other elements, such as, for example, on-chip memory, input/output modules, etc. Additionally, although a multi-core processor with only two processor cores 102 is described with reference to FIG. 1, a multi-core processor with more than two processor cores is possible.

In an embodiment, each processor core in a multi-core processor performs functional processing independent of each other in that program instructions are read and executed at the respective processor core by the physical circuits of that processor core. In some embodiments, multiple processing cores may work in tandem to complete a processing task, however, the processor cores themselves are independently reading and executing program instructions within the physical circuits of the respective processing core. In an embodiment, the instructions that are executed by the physical circuits of the processor cores are ordinary CPU instructions such as add, move data, and branch. In an embodiment, a set of at least two processor cores independently perform respective first and second sets of functional processing (e.g., executing program instructions), where the functional processing sets do not overlap in that operations performed by the physical circuits of the respective processor cores do not execute the same program instruction.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit device comprising:
    first and second processor cores configured to perform a respective first and second set of functional processing;
    a core-specific process state monitor associated with the first processor core;
    a core-specific process state monitor associated with the second processor core;
    a core-specific aging monitor associated with the first processor core;
    a core-specific aging monitor associated with the second processor core;
    a power management unit;
    a clock generation unit;
    a control system configured to individually control operating points of the first and second processor cores and workload in response to feedback from the core-specific process state monitors and from the core-specific aging monitors;
    wherein the control system comprises a workload scheduler configured to control the distribution of workload amongst the first and second processor cores based on a relative performance amongst the first and second processor cores as indicated by the feedback from at least one of the core-specific process state monitors and the core-specific aging monitors, wherein controlling the distribution of workload amongst the first and second processor cores comprises controlling how the execution of instructions by the first and second processors is distributed amongst the first and second processor cores.

2. The integrated circuit device of claim 1, wherein the control system comprises an operating point scheduler configured to control the voltage applied to the processor cores by the power management unit on a per-core basis.

3. The integrated circuit device of claim 2 wherein the operating point scheduler is configured to control at least one of the supply voltage, $V_{DD}$, and the body bias, $V_{BB}$, on a per-core basis.

4. The integrated circuit device of claim 1, wherein the control system comprises an operating point scheduler configured to control the clock frequency supplied to the processor cores by the clock generation unit on a per-core basis.

5. The integrated circuit device of claim 1, wherein the control system comprises:
    an operating point scheduler configured to control the power management unit and the clock generation unit; and
    a controller configured to control the operating point scheduler and the workload scheduler.

6. The integrated circuit device of claim 1, wherein the control system comprises:
    an operating point scheduler configured to control the power management unit to set at least one of the supply voltage, $V_{DD}$, and the body bias voltage, $V_{BB}$, supplied to the processor cores on a per-core basis and to control the clock generation unit to set the frequency of the clock that is provided to the processor cores on a per-core basis.

7. The integrated circuit device of claim 1, wherein the control system comprises:
    an operating point scheduler configured to adjust the voltage supplied to the processor cores by the power management unit on a per-core basis in response to the feedback from the core-specific process state monitors and from the core-specific aging monitors and to adjust the clock frequency supplied to the processor cores by the clock generation unit on a per-core basis in response to the feedback from the core-specific process state monitors and from the core-specific aging monitors.

8. The integrated circuit device of claim 1 wherein the core-specific process state monitors comprise core-specific process state monitor circuits in the integrated circuit device and wherein the core-specific aging monitors comprise core-specific aging monitor circuits in the integrated circuit device.

9. The integrated circuit device of claim 1, wherein the control system is configured to power-gate a relatively slow processor core.

10. A method for operating an integrated circuit device that includes multiple processor cores, the method comprising:
    monitoring process state parameters of the processor cores using core-specific process state monitors in the integrated circuit;

monitoring aging state parameters of the processor cores using core-specific aging state monitors in the integrated circuit;

adjusting power and clock frequency to the processor cores on a processor-specific basis in response to the process state and aging state monitoring; and adjusting workload distribution amongst the processor cores based on a relative performance amongst the processor cores as indicated by feedback from at least one of the process state parameters monitoring and the aging state parameters monitoring, wherein adjusting workload distribution amongst the processor cores comprises controlling how the execution of instructions by the processor cores is distributed amongst the processor cores.

11. The method of claim 10, wherein monitoring process state and aging state parameters comprises identifying a relatively fast processor core and a relatively slow processor core amongst the multiple processor cores.

12. The method of claim 11, wherein adjusting power and clock frequencies and adjusting workload distribution comprises power-gating a relatively slow processor core.

13. The method of claim 12, further comprising determining that the relatively fast processor core has become a relatively slow processor core and power-gating the relatively slow processor core.

14. The method of claim 13, further comprising determining that the relatively slow processor core has become a relatively fast processor core an power-gating the relatively slow processor core.

15. The method of claim 10, wherein adjusting the workload distribution amongst the processor cores comprises disabling a clock signal to a processor core to halt instruction execution by the respective processor core.

16. An integrated circuit device comprising:
multiple processor cores configured to perform instruction processing independent of each other;
a core-specific process state monitor associated with each one of the multiple processor cores;
a core-specific aging state monitor associated with each one of the multiple processor cores;
a power management unit;
a clock generation unit;
a control system comprising:
an operating point scheduler configured to control voltages and clock frequencies supplied to the processor cores on a per-core basis in response to feedback from the core-specific process state monitors and from the core-specific aging monitors; and
a workload scheduler configured to control workload distribution amongst the first and second processor cores in response to feedback from the core-specific process state monitors and from the core-specific aging monitors based on a relative performance amongst the first and second processor cores as indicated by the feedback from at least one of the core-specific process state monitors and the core-specific aging monitors, wherein controlling the distribution of workload amongst the first and second processor cores comprises controlling how the execution of instructions by the first and second processors is distributed amongst the first and second processor cores.

17. The integrated circuit device of claim 16 wherein the operating point scheduler is configured to control at least one of the supply voltage, $V_{DD}$, and the body bias, $V_{BB}$, supplied to the processor cores by the power management unit on a per-core basis, and wherein the operating point scheduler is configured to control the clock frequency supplied to the processor cores by the clock generation unit on a per-core basis.

18. The integrated circuit device of claim 17, wherein the control system is configured to power-gate a relatively slow processor core and push workload to a relatively fast processor core.

19. The integrated circuit device of claim 16 wherein the core-specific process state monitors comprise core-specific process state monitor circuits in the integrated circuit device and wherein the core-specific aging monitors comprise core-specific aging monitor circuits in the integrated circuit device.

* * * * *